United States Patent [19]

Rapelje

[11] Patent Number: 4,654,995
[45] Date of Patent: Apr. 7, 1987

[54] ARTICULATED FISHING LURE WITH REINFORCEMENT WEB

[76] Inventor: Donald G. Rapelje, 2600 NW. Cascade, East Wenatchee, Wash. 98801

[21] Appl. No.: 772,549

[22] Filed: Sep. 4, 1985

[51] Int. Cl.$^4$ ............................................. A01K 85/00
[52] U.S. Cl. .................................... 43/42.15; 43/42.24
[58] Field of Search ................. 43/42.15, 42.24, 42.26, 43/42.27, 42.28, 42.3

[56] References Cited

U.S. PATENT DOCUMENTS

| | | | |
|---|---|---|---|
| 588,729 | 8/1897 | Harris | 43/42.3 |
| 1,545,683 | 7/1925 | Nowak | 43/42.15 |
| 1,553,933 | 9/1925 | Dills | 43/42.26 |
| 1,581,833 | 8/1922 | Bonnett . | |
| 2,238,832 | 5/1939 | Thoren . | |
| 2,619,760 | 12/1952 | Maddux | 43/42.15 |
| 3,009,279 | 4/1958 | Jacobson . | |
| 3,218,750 | 6/1954 | Lewin . | |
| 3,429,066 | 2/1969 | McClellan | 43/42.24 |
| 3,967,406 | 7/1976 | Anderson | 43/42.24 |
| 4,317,305 | 7/1980 | Firmin . | |

Primary Examiner—Kuang Y. Lin
Assistant Examiner—G. M. Reid
Attorney, Agent, or Firm—Kolisch, Hartwell & Dickinson

[57] ABSTRACT

A fishing lure includes a first body segment having front and rear ends and a center of buoyancy, a second body segment having front and rear ends and a center of buoyancy, and an articulated hinge joining the rear of the first segment to the front end of said second segment at a point below their respective center of buoyancies. Additionally, at least one fish hook is attached to at least one body segment. The lure also includes front and rear retarding surfaces having a known size relationship to one another, and a flexible tail portion, constructed to simulate the tail of an aquatic life form. The entire lure may be formed of a molded portion surrounding a mesh portion, to provide a strong, resilient lure, and having a fish hook threaded through the molded and mesh portions. A line attachment eye is provided to secure the lure to a fishing line. The eye may be positioned below the center of buoyancy.

15 Claims, 8 Drawing Figures

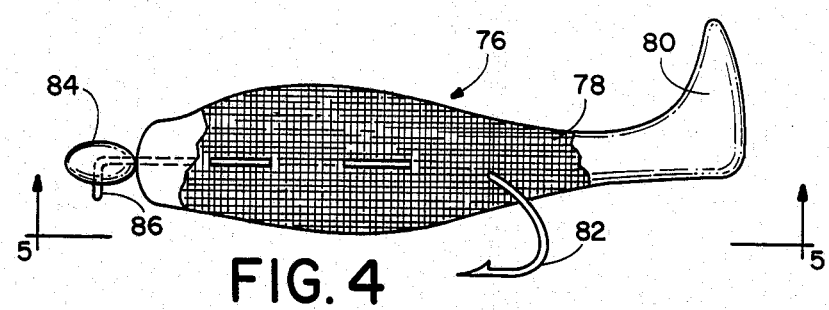
FIG. 4
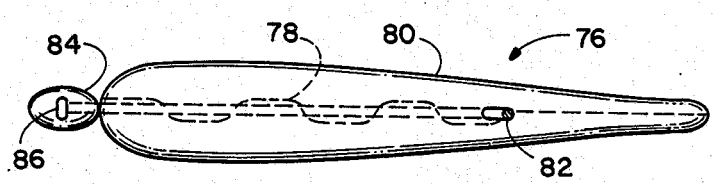
FIG. 5
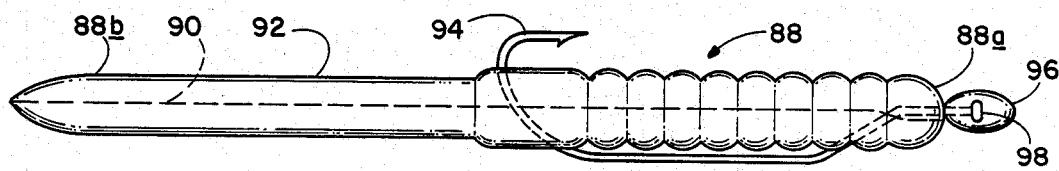
FIG. 6
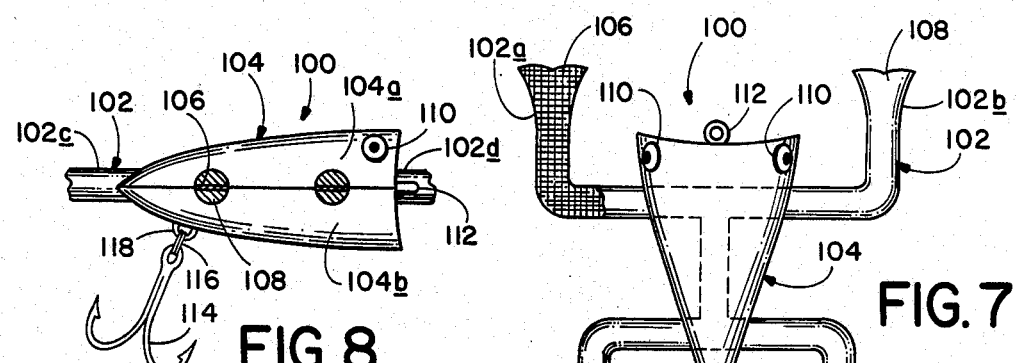
FIG. 8
FIG. 7

4,654,995

ARTICULATED FISHING LURE WITH REINFORCEMENT WEB

BACKGROUND AND SUMMARY OF THE INVENTION

This invention pertains to a fishing lure, and particularly to a fishing lure which accurately simulates the movement of an aquatic animal through a body of water. One form of the lure includes articulated body segments.

A variety of articulated fishing lures are known. The known articulated fishing lures are generally constructed to simulate the swimming motion of a fish or other aquatic life form through a body of water. While many of the lures come close to achieving their objective, accurate simulation of the swimming motion of an aquatic animal is not achieved by the known lures.

Another form of the lure includes a molded, resilient plastic portion. Known plastic lures, of the type made from "worm" plastic, are susceptible to non-hook engaging fish bites, which destroy the lure and which do not bury a fish into contact with a hook.

An object of the instant invention is to provide a fishing lure which will accurately simulate the swimming motions of an aquatic animal.

Another object of the instant invention is to provide a fishig lure which, while constructed of a material with a specific gravity less than that of water, will submerge as it is pulled through the water.

Yet another object of the instant invention is to provide a fishing lure which will not readily disintegrate when struck by a fish.

Still another object of the instant invention is to provide a fishing lure with a life-like tail portion which will remain intact when bitten by a game fish.

The fishing lure of the instant invention includes a first body segment having front and rear ends and a center of buoyancy. A second body segment also has front and rear ends and a center of buoyancy. The segments are joined by hinge elements which are attached to the rear end of the first segment and to the front end of the second segment at a point which is below their respective segment's center of buoyancy. The lure also includes front and rear retarding surfaces. At least one hook is attached to at least one body segment. A tail includes a web portion which is surrounded by a molded elastomeric portion and is constructed to simulate the tail of an aquatic life form.

In another embodiment of the lure, a flexible web is embedded in a formed portion which is constructed to simulate the appearance of an aquatic animal. A hook is inserted through the formed portion and the web to provide a strong, flexible lure.

These and other objects and advantages of the instant invention will become more fully apparent as the description which follows is read in conjunction with the drawings.

DESCRIPTION OF THE DRAWINGS

FIG. 4 is a side elevation of a fishing lure constructed according to a second form of the invention, with portions broken away to show detail.

FIG. 5 is a bottom plan view of the lure of FIG. 4, taken generally along the line 5—5 in FIG. 4.

FIG. 6 is a top plan view of another form of a lure constructed according to the instant invention.

FIG. 7 is a top plan view of a lure constructed according to the instant invention, with portions broken away to show detail.

FIG. 8 is a side elevation of the lure of FIG. 7, with portions broken away to show detail.

DETAILED DESCRIPTION OF THE PREFERRED EMBODIMENT

Figure 1:
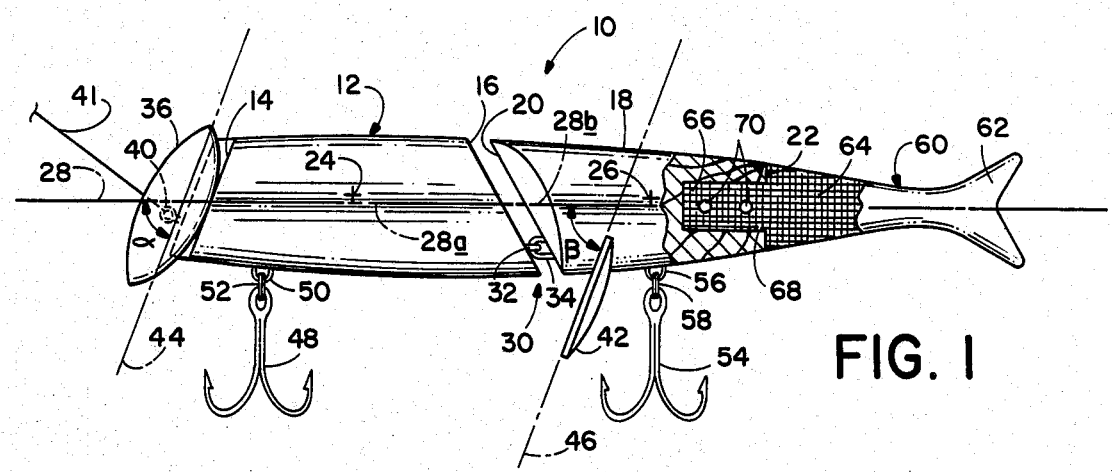
FIG. 1 is a side elevation of a fishing lure constructed according to the instant invention, with portions broken away to show detail.

Turning now to the drawings, and initially to FIG. 1, a fishing lure constructed according to one form of the invention is shown generally at 10. Lure 10 includes a first body segment 12 which includes a front end 14 and a rear end 16. Rear end 16 may be upwardly, forwardly inclined. Lure 10 further includes a second body segment 18 which has a front end 20 and a rear end 22. Front end 20, like rear end 16, may be upwardly, forwardly inclined and may also be wedge shaped. The wedge shaped end has an apex along a vertical, medial plane of the second segment.

Each body segment has a center of buoyancy. The center of buoyancy for the front body segment is identified by cross 24, and the center of buoyancy for the second body segment is identified by cross 26. The lure has a horizontal axis 28 which includes a first portion 28a extending through the first body segment and a second portion 28b extending through the second body segment. Body segments 12 and 18 may be made of wood, polyurethane high-impact foam plastic or may be formed of molded plastic with air (buoyant) cavities. Centers of buoyancy 24, 26 may be adjusted within the confines of segments 12 and 18 by varying the density of the material from which these segments are made, changing the shape thereof, or adding weight to the segments.

The body segments are joined together by what is referred to herein as articulation means 30 which includes a first hinge element 32 which is attached to rear end 16 of segment 12 and a second hinge element 34 which is attached to front end 20 of segment 18. Elements 32 and 34 are located on ends 16 and 20 such that they are below centers of buoyancy 24, 26. In the preferred embodiment, elements 32 and 34 are formed of wire which is bent to form an interlocking hinge, portions of the wire being imbedded in the material of segments 12 and 18. Alternately, articulation means 30 may be formed of interlocking eye screws or similar structures.

Figure 2:
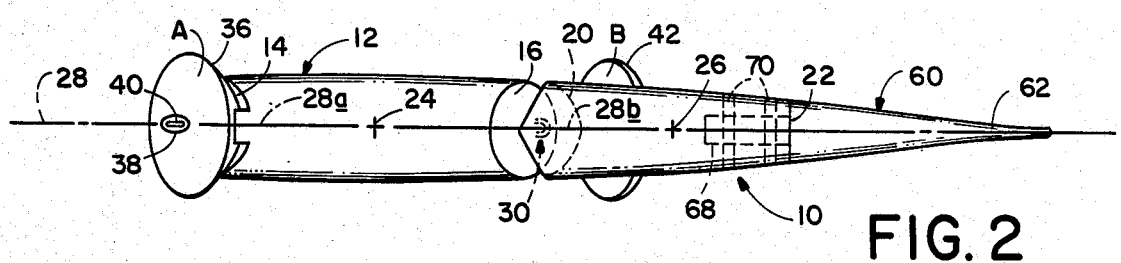
FIG. 2 is a top plan view of the lure of FIG. 1.

Referring now to FIGS. 1 and 2, a front retarding surface, or front retarder 36, is attached to front end 14 of segment 12. Front retarder 36 has a surface area, designated by A. In the preferred embodiment, a bore 38 extends through retarder 36 and an eye 40 is positioned in the bore, attached to front end 14. Eye 40 is used to attach a fishing line 41 to lure 10 and is also referred to herein as line attachment means. Eye 40, in the preferred embodiment, is secured to end 14 below center of buoyancy 24. Eye 40 is additionally positioned such that a greater portion of area A is located below the eye than is present above the eye.

A rear retarding surface, or rear retarder 42, is attached adjacent front end 20 of second segment 18.

Retarder 42 has a surface area indicated by B. The relationship between area A of retarder 36 and area B of retarder 42 is such that B equals at least 50% of A. Such a relationship has been empirically determined to provide the lure with the most authentic, fish-like swimming characteristics and insures that axis 28a and axis 28b will remain in substantially the same horizontal plane. The front retarder must also overcome resistance from line 41 and may be required to have a larger surface area to produce desired movements.

Retarders 36 and 42 may be substantially planar or, as in the preferred embodiment, may have a slightly concave forward facing surface. Retarders 36 and 42 and inclined, by substantially similar angles, with respect to the horizontal axes of each segment. A line 44 extending through the medial portion of retarder 36 intersects axis 28a at an acute angle $\alpha$. Likewise, a line 46 extending through the medial surface of retarder 42, intersects axis 28b at an angle $\beta$. Angles $\alpha$ and $\beta$ are approximately equal. While $\alpha$ and $\beta$ could be as large as 90 degrees, they are preferably set between 40° and 80°. In the preferred embodiment, $\alpha$ is set at 55° and $\beta$ is set at 65°. With respect to angle $\alpha$, in particular, as the preferred embodiment of lure 10 is constructed of material which has a specific gravity less than that of water, which would allow the lure to float, it is required that $\alpha$ be less than 90 degrees in order to cause the lure to dive as it moves relative to a body of water. Other forms of the lure could be made using material which would sink i.e., specific gravity greater than one. A floating version of the lure could be used as a bass plug.

Rear retarding surface 42 extends outward and downward from the sides and bottom of second segment 18. Second hinge element 34 is constructed and arranged, in the preferred embodiment such that it is attached to front end 20 below the uppermost portion of rear retarding surface 42.

A front hook 48 is attached to first body segment 12 by a wire loop 50 and a split ring 52. Likewise, a rear hook 54 is attached to a second wire loop 56 and a second split ring 58. It should be understood that although two hooks are provided in the preferred embodiment, a single hook may be used and may be attached to either body segment. Alternately, more than two hooks could be attached to the lure, depending upon local fishing regulations.

A flexible tail portion 60 is attached to second body segment 18. Tail 60 is formed by molding an elastomeric portion 62 around a web portion 64 in a form which simulates the tail of a fish, or similar aquatic life form. Web 64, in the preferred embodiment, is a nylon mesh fabric which is placed in a conventional mold, between the two halves of the mold, and then surrounded by suitable elastomeric material, such as PVC or other suitable elastomeric material, such as "worm plastic."

Second body segment 18, in the preferred embodiment, has a tail-receiving portion 66 formed in the rear end thereof. Tail portion 60 has a tab 68 which is conformal with and insertable in tail-receiving portion 66. Pins 70 are inserted through body segment 18 and tab 68 to secure tail portion 60 to segment 18.

The tail portion constructed according to the invention eliminates a problem frequently encountered by fisherman wherein a fish bites on the lure and removes a portion of the lure without encountering a hook. The inclusion of web 64 in tail portion 60 increases the force of the bite which is fish must make in order to sever a portion of the lure without encountering a hook. Generally, a fish encountering such resistance would take a larger bit of the lure, thus encountering hook 54. Pins 70 may be arranged such that tail 60 could be removed and replaced with a similar structure should it become damaged through use. The entire lure, body segments and tail, may be painted to simulate an aquatic life form or may be brightly colored, in the hope of attracting a game fish.

Figure 3:
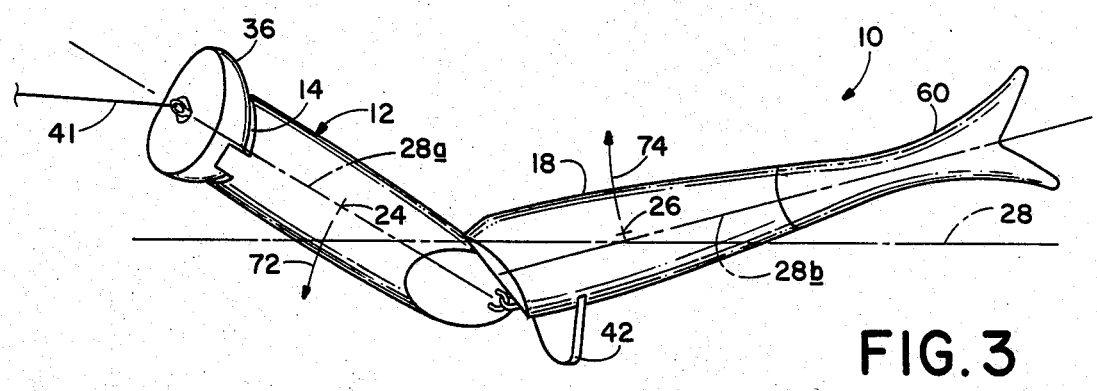
FIG. 3 is a top view of the lure of FIGS. 1 and 2, shown in an articulated, swiveled position.

Turning now to FIG. 3, lure 10 is shown in an articulated position, which is the result of the construction and arrangement of retarders 36 and 42 in conjunction with articulation means 30. Both retarders have a tendency to make the front ends of their respective segments oscillate in a side-to-side motion. Additionally, while retarder 36 tends to act like a diving plane, forcing the front of the first body segment downward, a similar force, produced by retarder 42, acts on the front of second body segment 18. The force produced by retarder 42 is transmitted to the rear of first segment 12. The result is that the two body segments are held in substantial alignment about a horizontal plane, such as might pass through horizontal axis 28. The side-to-side motion thus generated tends to produce a moment of force about centers of buoyancy 24, 26 and these moments result in the swiging of segments 12 and 18 relative one another, as depicted by the articulated position of FIG. 3. As the front end of first segment 12 swings to its right, the top of the lure tilts toward the left, as indicated by arrow 72. This tilt is the result of forces generated by the front retarding surface and the pull of line 41. The swinging of first segment 12 to the right urges the front of second segment 18 to the left, thereby exposing the right half of wedge-shaped front end 20 to a relatively fixed body of water. The connection of articulation means 30 below the centers of buoyancy, at a point close to the bottom of the lure, and the force of the water on front end 20, results in the swinging of the front of second segment 18 toward the left, and tilting of the top of the second segment to the right, as indicated by arrow 74.

As the segments approach their most articulated positions, the forces of the water on the now tilted retarding surfaces 36 and 42 urge the segments of the lure back to an in line position. Momentum of the segments will cause the segments to over-shoot the in-line position where forces similar to those previously described will tend to swing the front end of the first body segment to the left and the front end of the second body segment to the right, while the segments simultaneously tilt, or swivel, relative one another in opposite directions. The appearance is that of a fish swimming about a longitudinal axis with a very slight horizontal deviation, or quiver, from the horizontal axis. The combination of the side-to-side swinging and the relative swiveling of the second segment to the first segment will continue so long as the lure is drawn through the water, generally at a speed of one to five knots. Such motion is typical of swimming motions of a small fish, which the lure is intended to simulate, and which is thought to be attractive to game fish. The swiveling motion provides more light flash (reflection of light off the lure's surface) as the lure moves through the water.

Turning now to FIGS. 4 and 5, a second embodiment of the lure is shown. A lure 76 includes a web portion 78 and a formed portion 80. A hook 82 is threaded through the lure and has a weight 84 fixed to one end thereof, adjacent an eye 86. Referring to FIG. 5, it may be seen that web portion 78 is formed in a meandering path throughout the length of lure 76. This enables the insertion of hook 82 to pass through web 78 several times along the length of the hook, thereby insuring that the hook fully engages web 78. Lure 76 is formed similarly to flexible tail portion 60 in the previously described embodiment.

Turning to FIG. 6, a lure 88 is shown which has a web portion 90 extending the length thereof. Web 90 is surrounded by formed portion 92. In this particular embodiment of the invention, web 90 is formed in a substantially flat plane extending through the center of lure 88. Hook 94 is threaded through the head end 88*a* of lure 88 and extends, externally of the lure for a stretch, after which it passes through a medial section of the lure. Hook 94 includes a weight 96 and an eye 98, through which a line is attached. A conventionally formed lure which might resemble lure 88 would be susceptible to having the tail portion 88*b* of the lure severed from the remainder of the lure by a strike, without the fish ever reaching hook 94. The lure as shown, when struck by fish, would present a somewhat solid object, which would not break up following the strike and which the fish would strike a second and possibly third time, in an attempt to feed. The fish would presumably take successive bites, working towards head 88*a* and at some point would encounter hook 94.

Turning now to FIGS. 7 and 8, still another embodiment of the lure is depicted at 100. Lure 100 represents a stylized amphibian creature, such as a frog. Lure 100 includes a flexible portion 102 and a body portion 104.

Flexible portion 102, in the preferred embodiment, is a molded structure which includes a web 106 and a formed portion 108, which encloses the web. Portion 102 is molded to represent the fore limbs, 102*a*, 102*b* and hind limbs 102*c*, 102*d* of a frog. For ease of construction, the four limbs are integrally molded with web 106 extending along a frontal plane thereof. Body portion 104 may be formed of wood or plastic material and may be molded or carved.

Turning now to FIG. 8, body portion 104 includes an upper segment 104*a*, having an eye spot 110 formed thereon, and a lower segment 104*b*. A screw eye 112 forms a line attachment means. A hook 114 is attached, through a split ring 116, to a hook attachment eye 118 which is secured at the rear of segment 104*b*.

Lures 76, 88 and 100 may be manipulated by the fisherman to simulate movements of the aquatic creatures which they represent to produce a movement which simulates the swimming movements of the representative animals, thus producing a life-like appearance.

Thus a fishing lure and several embodiments thereof have been disclosed which will accurately simulate the movement of an aquatic animal through a body of water. One form of the lure will simulate the movement of a small fish through the water while other forms will simulate movement of other aquatic life forms through water. Flexible portions of the lure are provided with a tough, flexible web embedded in a resilient molded portion which simulates a fish tail or an entire aquatic life form. The web strengthens the normal resilient material and reduces the possibility of a fish biting a portion of the lure without encountering a fish hook in the process.

While a preferred embodiment of the invention has been described herein, it is understood that certain variations and modifications may be made without departing from the spirit of the invention.

It is claimed and desired to secure by Letters Patent:

1. A fishing lure comprising:
   a first body segment having front and rear ends and a center of buoyancy, said rear end having an end face;
   a second body segment having front and rear ends and a center of buoyancy, said front end having an end face;
   wherein each body segment has a horizontal axis and wherein a front retarding surface is fixed adjacent the front end of said first segment and a rear retarding surface is fixed adjacent the front end of said second segment, said rear retarding surface having a surface area of at least 50% of the surface area of said front retarding surface, the retarding surfaces on both segments being inclined with respect to said horizontal axes by substantially similar angles of between 40 degrees and 80 degrees;
   articulation means attached to and joining said end face of said first segment to said end face of said second segment only at a point below their respective centers of buoyancy, wherein said first body segment and said second body segment are joined only by said articulation means;
   wherein the front and rear retarding surfaces are constructed and arranged to produce a side-to-side, relative two-dimensional swiveling motion of the first and second body segment axes about said articulation means, said first segment front end and said second segment rear end having movements of a greater side-to-side magnitude than that of said articulation means; and
   at least one hook attached to at least one body segment.

2. The lure of claim 1 wherein the rear retarding surface extends downward and forward from the sides and bottom of said second body segment and said articulation means is attached to said second segment at a point below the uppermost portion of said rear retarding surface.

3. The lure of claim 1 wherein said front retarding surface extends over the entire front end of said first segment and extends below said first segment, and which further includes line attachment means fixed to said first body segment.

4. The lure of claim 1 which further includes a flexible tail portion attached to said second segment, said tail portion having a web portion which is surrounded by an elastomeric portion.

5. The lure of claim 4 wherein said second segment has a tail receiving portion formed in the rear end thereof and said tail portion has a tab which is received in said tail receiving portion, said tail portion being constructed and arranged to simulate the tail of an aquatic life form.

6. The lure of claim 1 wherein said body segments have a specific gravity less than that of water.

7. An articulated fishing lure comprising:
   a first body segment having an upwardly forwardly inclined rear end face and a center of buoyancy;
   a second body segment having an upwardly forwardly inclined front end face and a center of buoyancy; and
   articulation means joining said body segments only at a point below their respective centers of buoyancy, said articulation means being attached to the rear end face of said first segment and to said front end face of said second segment; wherein said articulation means includes a first hinge element attached to said first segment on its rear end face, and a second hinge element attached to said second segment on its front end face, said first and second hinge elements being operable to facilitate two-dimensional movement of said second segment relative to said first segment and said body segments are joined only by said articulation means.

8. The lure of claim 7 wherein said second body segment includes a retarding surface adjacent said front end extending downwardly and fowardly from the sides and bottom thereof, said second hinge element being attached at a point below the uppermost portion of said retarding surface.

9. The lure of claim 7 wherein said first body segment has a front end and which further includes line attachment means fixed to said first body segment on its front end below said center of buoyancy.

10. The lure of claim 9 wherein said front end is constructed and arranged to cause downward movement of the lure as the lure moves relative to a body of water.

11. The lure of claim 7 wherein said inclined front end of said second segment is wedge-shaped, having an apex along a medial plane of said second segment.

12. A fishing lure, in combination with a fish hook, comprising:
   a formed portion; and
   a resilient flexible nylon mesh web embedded in said formed portion, wherein said web is embedded in a siusoidal-like meandering pattern about a median plane of said formed portion.

13. The lure of claim 12 wherein said formed portion includes a molded structure substantially surrounding said web and is constructed to simulate the appearance of an aquatic animal.

14. The lure of claim 13 wherein said molded structure is formed of a resilient elastomeric substance.

15. The lure of claim 12 wherein said formed portion includes multiple, integrally formed appendages and which further includes a relatively rigid portion attached intermediate the ends of said appendages to stimulate a body of an aquatic animal.

* * * * *